United States Patent Office 3,285,895
Patented Nov. 15, 1966

3,285,895
POLYMERIZATION OF VINYL ESTERS
James C. MacKenzie, Wellesley Hills, and Adam Orzechowski, Waltham, Mass., assignors to Cabot Corporation, Boston, Mass., a corporation of Delaware
No Drawing. Filed Oct. 11, 1962, Ser. No. 229,970
The portion of the term of the patent subsequent to Jan. 18, 1982, has been disclaimed
20 Claims. (Cl. 260—89.1)

This invention relates to the polymerization and copolymerization of vinyl esters such as vinyl acetate, vinyl propionate, vinyl benzoate and vinyl stearate.

This case is a continuation in part of U.S. Serial No. 215,782, filed August 9, 1962, now abandoned.

Accordingly, it is a principal object of the present invention to provide a novel process for polymerizing vinyl esters and mixtures thereof.

Other objects of the present invention will in part be obvious and will in part appear hereinafter.

In accordance with the present invention, vinyl esters are polymerized and/or copolymerized by catalysts comprising (a) the product of the reaction carried out under certain conditions between a halide-type compound of a metal of Groups IVa, Va or VIa and a finely divided particulate inorganic solid having surface hydroxyl groups thereon, and (b) an organometallic compound. The polymerization or copolymerization reaction can be effected at suitable temperatures within the range of from about −80° C. to about 190° C., and pressures ranging from below atmospheric upwardly to any desired maximum pressure.

Inorganic solids suitable for the purposes of the present invention generally include any inorganic compound which is available in finely divided particulate form with hydroxyl groups on the surface thereof. For example, oxides such as alumina, zirconia, and silica, carbon blacks such as channel black and furnace black, and aluminates such as corundum are generally suitable for the purposes of the present invention. In particular, inorganic solids having an average particle diameter of less than about 0.1 micron and having at least about $1 \times 10^{-4}$ equivalents per gram of hydroxyl groups chemically bonded to the surface thereof, as set forth in more detail in U.S. application Serial No. 2,861, filed January 18, 1960, now abandoned, are preferred in accordance with the present invention.

Halide-type compounds of Groups IVa, Va and VIa (hereinafter generally referred to as transition metal halides) suitable for the purposes of the present invention are the compounds conforming to the empirical formula:

$$TO_aX_b$$

wherein T is a metal of Groups IVa, Va or VIa (where the group numbers correspond to the Mendeleev Periodic System); O is oxygen; $a$ equals 0 or 1; each X is any halogen; and $b$ is an integer from 1 to 6.

Examples of suitable compounds conforming to said empirical formula are halides such as zirconium tetrachloride, vanadium tetrachloride, and titanium tetraiodide, and oxyhalides such as chromium oxychloride and vanadium oxychloride.

The conditions under which reaction between the transition metal halide and the finely divided inorganic solid can be accomplished are subject to considerable variation. However, in order to obtain a catalyst component with exceptionally high activity and reproducible character and performance, it has been found to be all important that the finely divided inorganic solid be essentially dry and anhydrous (i.e. free of molecular water in any form) at the time it is brought into contact with the transition metal halide. In addition, it is recommended that the reaction of the inorganic solid and the transition metal halide be accomplished so as to allow by-products of the reaction to be eliminated from the reaction zone in order to thereby insure that said reaction goes to completion. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture. Generally speaking, almost any temperature between about 0° C. and 300° C. and even higher temperatures can be used satisfactorily, but room temperature to about 105° C. is generally preferred. Assuming provision is made for intimate contact of the dry inorganic solid and the transition metal halide, the *minimum* time required to accomplish the chemical reaction will vary from about 1 hour at room temperature to about 15 minutes at temperatures of 100° C. or over. Temperatures substantially higher than about 300° C., e.g. 500° C., are completely needless and therefore of little or no interest.

Elimination of by-products of the reaction from the reaction zone, i.e., from the reaction medium, can be accomplished in any convenient manner such as, by sweeping the reaction vessel with an inert gas, by carrying out the reaction at sufficiently elevated temperatures while stirring to drive by-products out of the reaction medium, or by complexing or reacting said by-products with suitable substances such as tertiary amines, tertiary arsines, tertiary phosphines, terpenes, terpinenes, tetrasubstituted hydrazines, carbides such as calcium carbide, and other substances which will react or complex with said by-products and thereby eliminate them.

Organometallic compounds suitable for the purposes of the present invention are the compounds chosen from the group consisting of (a) compounds conforming to the empirical formula $$MM'_vX_nR_y$$

wherein M is a metal chosen from Groups I, II and III of the periodic table; M' is a metal of Group I of the periodic table; $v$ equals 0 or 1; each X is any halogen; $n$ equals 0, 1, 2 or 3; each R is any monovalent hydrocarbon radical or hydrogen; and $y$ equals 1, 2, 3 or 4; and (b) compounds conforming to the empirical formula $$R'_pH_mSiO_{\frac{4-(m+p)}{2}}$$

wherein each R' is chosen from the group consisting of monovalent hydrocarbon radicals, monovalent alkoxy radicals, monovalent aryloxy radicals, and the halogens; $p$ is 0, 1, 2 or 3; each H is a hydride radical; $m$ is 1, 2, 3 or 4; Si is silicon; and O is oxygen.

Specific examples of R' groups for substitution in the above formula include methyl, 2-methyl-2-butenyl, n-dodecyl, 4-cyclohexylethyl, methylnaphthylethyl, 2,2,1 bicycloheptyl, tolyl, xylyl, xenyl, methoxy, isobutoxy, n-octyloxy, phenoxy and 1,2-naphthoxy.

Specific examples of compounds conforming to the formula $$R'_pH_mSiO_{\frac{4-(m+p)}{2}}$$

which are suitable for the purposes of the present invention are silane—$SiH_4$;
ethylsilane—$H_3SiC_2H_5$;
diethylmonochlorosilane—$HSiCl(C_2H_5)_2$;
dichlorosilane—$H_2SiCl_2$;
methyldiethylsilane—$HSi(C_2H_5)_2CH_3$;
trimethoxysilane—$HSi(OCH_3)_3$;
tribenzylsilane—$HSi(CH_2C_6H_5)_3$;
dicyclohexylphenylsilane—$HSiC_6H_5(C_6H_{11})_2$;
triphenoxysilane—$HSi(OC_6H_5)_3$;
cyclic alkyl hydrogen silicones such as $(CH_3HSiO)_6$;
and linear alkyl hydrogen silicones such as $$(CH_2)_2HSiOSiH(CH_3)_2$$

Organometallic compounds which conform to the formula $$MM'_vX_nR_y$$

and which are suitable for the practice of the invention include compounds conforming to the subgeneric formula:

$$M(R)_k$$

wherein M is a Group I, II or III metal, such as sodium, beryllium, boron, aluminum and gallium; wherein $k$ equals 1, 2 or 3 depending upon the valency of M; and wherein each R may be hydrogen or any monovalent hydrocarbon radical. Examples of suitable hydrocarbon radicals include aryl or alkaryl radicals, aliphatic hydrocarbon radicals, or derivatives, such as alkyl, cycloalkenylalkyl, arylalkyl, alkylcycloalkyl and cycloalkylalkenyl.

Specific examples of R groups for substitution in the above formula include methyl, isobutyl, hexyl, n-dodecyl, 2-methyl-2-butenyyl, 4-cyclohexylethyl, 2-phenylpropyl, methylnaphthylethyl, 2,2,1-bicycloheptyl, dimethylcyclohexyl, 5-cyclopentadienyl, phenylcyclohexyl, tolyl, xylyl, xenyl, and dimethylnaphthyl.

Specific compounds conforming to the empirical formula, $MM'_vX_nR_{y-n}$, and which are therefore suitable for the purposes of the present invention are organo compounds such as butyllithium, divinylmagnesium, di-p-tolylmercury, tri-n-amylboron, triisobutylaluminum, diisobutylaluminum bromide, phenylmercuric iodide, hexylcupric chloride, octylmagnesium hydride, triethyllithium aluminum bromide and sodiumdiphenyllithium. Definitely preferred, however, are the aluminum alkyls such as aluminum triisobutyl.

Further specific examples of suitable organometallic compounds conforming to the formula $$MM'_vX_nR_y$$

can be found in our copending U.S. application, Serial No. 2,861, filed January 18, 1960, now abandoned.

It is pointed out that catalysts formed with a silane require activation by heating to a temperature above about 100° C. and preferably above about 140° C. for at least about 1 hour. At higher temperatures, shorter periods of time are required. At substantially lower temperatures, the catalyst is either not formed at all or is of inferior quality.

Although it is appreciated that when R or R' in the above empirical formulae do not comprise at least one hydrocarbon radical, the resulting compounds cannot normally be termed organometallic compounds, compounds lacking at least one hydrocarbon radical comprise such a relatively small number of compounds included by said general formulae that for the purposes of the present invention, it is intended that these compounds be included within the generic term, organometallic compound. Accordingly, in the specification and in the claims, it is intended, and therefore it should be understood, that the term, organometallic compound, refers to all the compounds included within the scope of the above defined empirical formulae. In addition, it is pointed out that while, strictly speaking, silicon is not a metal, it is clearly intended, and therefore it should be understood, that for the purposes of the present specification and claims, silicon is a metal and the term "organometallic" includes within its scope all those compounds within the scope of the formula $$R'_pH_mSiO_{\frac{4-(m+p)}{2}}$$

Vinyl esters suitable for the purposes of the present invention are those conforming to the formula:

$$H_2C=\overset{D}{\underset{|}{C}}-O-\overset{O}{\underset{\|}{C}}-R''$$

wherein D is chosen from the group consisting of hydrogen, any hydrocarbon group having 1 to 3 carbon atoms and any substituted hydrocarbon group having 1 to 3 carbon atoms; and R'' is chosen from the group consisting of hydrocarbon radicals and halogen-substituted hydrocarbon radicals having 1–18 carbon atoms.

Specific examples of vinyl esters within the scope of the present disclosure, in addition to those already mentioned, are vinyl chloroacetate, vinyl trifluoroacetate, α-methyl vinyl tetrafluoroacetate, vinyl formate, vinyl diethyl acetate, vinyl tetrafluorocyclobutane carboxylate, α-methyl vinyl acetate, vinyl crotonate, vinyl dichlorobenzoate, and vinyl butyrate.

Using the catalysts of this invention, polymerization of the vinyl esters can be accomplished in the absence of liquids (other than the monomers themselves) solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also members of the aromatic hydrocarbon series such as isopropyl benzene, ethyltoluene, hemimellitene, pseudocumene, isodurene, isoamylbenzene, and particularly the mononuclear aromatic hydrocarbons such as xylenes, mesitylene and xylene-p-cymene mixtures, and the like are completely suitable.

The proportion of surface reacted particulate inorganic solid to organometallic compound utilized in preparing the catalyst is not usually a critical feature of the process. We have found from experience that a molar ratio of from 0.1 to 5 millimols of the organometallic compound per atom of transition metal chemically combined with the surface of the finely divided solid is to be preferred.

The quantity of catalyst, i.e., comprising both the surface reacted finely divided solid and the organometallic compound, to be utilized in the polymerization reaction may vary, but in general, the total quantity of catalyst that need be employed based on the weight of the charging stock is very small particularly when a very fine particle size oxide is utilized as the inorganic solid.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

EXAMPLE 1

To a 1,000 milliliter three neck, glass reaction vessel there is added 20 grams of "Cab-O-Sil," a pyrogenic silica produced by Cabot Corporation, which has an average particle diameter of 20 millimicrons and a hydroxyl group content on the surface thereof of about 1.5 milliequivalents per gram. Said reaction vessel is then placed in a vacuum drying oven heated to a temperature of about 100° C. for about twelve hours. Subsequently, the vessel is sealed without exposing the silica to the atmosphere and there is charged to said vessel 20 millimoles of titanium tetrachloride and 500 milliliters of isooctane. The vessel is then continuously stirred and maintained at refluxing temperature for a period of 6 hours while the contents thereof are swept by a stream of dry nitrogen. Subsequently, the extent of the reaction between the titanium tetrachloride and the silica is determined by measuring the quantity of HCl removed from the vessel by the nitrogen stream, and by testing the liquid contents of the vessel for the absence therein of titanium tetrachloride and the said silica is found to have 20 milliatoms of titanium on the surface thereof. 25 milliliters of this slurry containing about 1 milliatom of titanium bound to the surface of about 1 gram of silica, is then transferred from this reaction vessel to an 8 oz. bottle which has been previously flushed with dry nitrogen. Next, 2 millimoles of triisobutyl aluminum is added to the bottle followed by 200 millimoles of vinyl acetate monomer. The bottle is then continuously agitated at ambient temperatures for about 24 hours. The reaction products are analyzed and it is found that about 1.5 grams of solid vinyl acetate polymer has been produced.

EXAMPLE 2

To a 1,000 milliliter reaction vessel, there is added about 50 milliliters of the catalyst slurry produced in Example 1 which contains about 2 milliatoms of titanium bound to the surface of about 2 grams of silica. Next, 200 millimoles of vinyl chloroacetate monomer followed by 2 millimoles of triethylaluminum are added to the vessel. The vessel is then continuously agitated at ambient temperatures for 24 hours. The reaction products are analyzed and it is found that about 2 grams of solid vinyl chloroacetate polymer has been produced. When under the same conditions, the triethylaluminum or the silica bearing chemically combined titanium on the surface thereof is utilized alone as the catalyst, no solid polymer is produced.

EXAMPLE 3

To a 1,000 milliliter, three neck, glass reaction vessel there is added 7.5 grams of "Hi-Sil-X-303," a precipitated silica produced by Columbia Southern Chemical Corp. and which has an average particle diameter of about 23 millimicrons and a hydroxyl group content on the surface thereof of about 1.3 milliequivalents per gram. Said reaction vessel is then placed in a vacuum drying oven heated to a temperature of about 100° C., for about twelve hours. Subsequently, the vessel is sealed without exposing said silica to the atmosphere and there is charged to said vessel 6 millimoles of titanium tetrachloride and 400 milliliters of isooctane. The vessel is then continuously agitated and heated to, and maintained at, the refluxing temperature of isooctane for a period of 4 hours while the contents thereof are continuously swept with a stream of dry nitrogen. Subsequently, the extent of the reaction between the titanium tetrachloride and the silica is determined by measuring the quantity of HCl removed from the vessel by the nitrogen stream, and by testing the liquid contents of the vessel for the absence therein of titanium tetrachloride, and the said silica is found to have 6 millimoles of titanium chemically bound to the surface thereof. 1 gram of this silica containing about 0.8 millimole of titanium chemically bound to the surface thereof, and suspended in about 53.5 milliliters of isooctane is then transferred without exposure to the atmosphere from this reaction vessel to a 500 milliliter, three neck, glass reaction vessel which has been previously flushed with dry nitrogen. 100 milliliters of isooctane and 200 millimoles of vinyl benzoate are then charged to this second vessel. Next, 0.8 millimole of triethylaluminum is added, and the contents of said reaction vessel are continuously and vigorously stirred for about 24 hours. The reaction product is analyzed and it is found that about 2.5 grams of solid vinyl benzoate polymer has been produced.

EXAMPLE 4

To a 1,000 milliliter, three neck, glass reaction vessel there is added 10.6 grams of "Alon," a pyrogenic alumina produced by Deutsche Gold- und Silver-Scheideanstalt Vormals Roessler, and which has an average particle diameter of about 10–40 millimicrons and a hydroxyl group content on the surface thereof of about 0.7 milliequivalents per gram. Said reaction vessel is then placed in a vacuum drying oven heated to a temperature of about 110° C. for about fifteen hours. Subsequently, the vessel is sealed without exposing said alumina to the atmosphere and there is charged to said vessel 7 millimoles of vanadium oxytrichloride in 600 milliliters of isooctane. The vessel is then continuously stirred, and maintained at refluxing temperatures for a period of about 8 hours while the contents are swept with a stream of dry nitrogen. Subsequently, the extent of the reaction between the vanadium oxytrichloride and the alumina is determined by measuring the quantity of HCl removed from the vessel by the nitrogen stream, and by testing the liquid contents of the vessel for the absence therein of vanadium oxytrichloride, and the said alumina is found to have 7 milliatoms of vanadium chemically combined to the surface thereof. 86 milliliters of this slurry containing about 1 milliatom of vanadium bound to the surface of about 1.5 grams of alumina, is then transferred from this reaction vessel to a 500 milliliter reaction vessel which has been previously flushed with dry nitrogen. Next, 1 millimole of butyllithium is added to the said vessel followed by 200 millimoles of vinyl propionate monomer. Said second vessel is then continuously agitated at ambient temperatures for about 48 hours. The reaction products are analyzed and it is found that solid vinyl propionate polymer has been produced.

EXAMPLE 5

To a 2,000 milliliter, three neck, glass reaction vessel equipped with a stirrer, a condenser and nitrogen inlet and outlet tubes, there is added 25 grams of "Cab-O-Sil," a pyrogenic silica produced by Cabot Corporation, which has an average particle diameter of 20 millimicrons and a hydroxyl group content on the surface thereof of about 1.5 milliequivalents per gram. To said reaction vessel there is added 1700 milliliters of benzene and the resulting translucent slurry is dried by being heated to, and maintained at, the boiling point of benzene, i.e., about 80° C., for about 20 hours while a water/benzene azeotrope is removed from the reaction vessel by periodic distillation until about 450 milliliters of distillate has been removed. The vessel is then cooled and charged with 25 millimoles of titanium tetrachloride. The resulting slurry is then refluxed for 6 hours with continuous stirring while the contents are swept with a stream of dry nitrogen. Subsequently, the extent of the reaction between the titanium tetrachloride and the hydroxyl groups on the silica is determined by measuring the quantity of HCl that was produced and by testing the liquid contents of the vessel for the absence therein of titanium tetrachloride, and the said silica is found to have 25 milliatoms of titanium chemically bound to the surface thereof. A sample of 50 milliliters of this slurry containing about 1 milliatom of titanium bound to the surface of about 1 gram of silica, is then transferred from this reaction vessel to a 100 cc. stainless steel bomb which has been previously flushed with dry nitrogen. Next, 2 millimoles of triphenoxysilane is introduced into the bomb and the bomb is then continuously agitated and heated to, and maintained at, about 150° C. for about 1 hour. After the bomb has cooled down to ambient temperatures, 60 grams of vinyl acetate are introduced into the bomb and the bomb is then heated to, and maintained at, 80° C. while being continuously agitated for about 24 hours. The reaction products are analyzed and it is found that solid vinyl acetate polymer has been produced.

The polymers by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the polymers.

Obviously many changes may be made in the above described examples and procedure without departing from the scope of the invention. For example, although only transition metal chlorides are mentioned in the above examples, transition metal, bromides, iodides and fluorides are also suitable for the purposes of the present invention. For example, titanium tetrafluoride is entirely suitable.

Also pyrogenically coformed, or coprecipitated metal oxides, or metal oxides coformed with, or mixed with, other compounds are suitable finely divided inorganic solids for the purposes of the present invention.

Accordingly, it is intended that the above disclosure be regarded as illustrative and as in no way limiting the scope of the invention.

What we claim is:

1. A process for homopolymerizing vinyl esters and mixtures of vinyl esters which comprises contacting at temperatures between about −80° C. and 190° C., a substance conforming to the formula

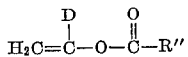

where D is chosen from the group consisting of hydrogen, any hydrocarbon group having 1 to 3 carbon atoms and any substituted hydrocarbon group having 1 to 3 carbon atoms; and R″ is any radical chosen from the group consisting of hydrocarbon radicals and halogen-substituted hydrocarbon radicals having 1–18 carbon atoms, with a catalyst comprising (a) a finely divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

wherein T is a metal chosen from the group consisting of the metals of Groups IVa, Va and VIa; O is oxygen; $a$ is a number from 0 to 1; each X is any halogen; $b$ is a number from 1 to 5; and where said structures are chemically linked directly from T to at least one oxygen atom in the surface of said solid; and (b) an organometallic compound chosen from the group consisting of compounds conforming to the empirical formulae (1) $\quad MM'_vX_nR_y$ where M is chosen from the group consisting of the metals of Groups I, II and III; M′ is a metal of Group I; $v$ is 0 or 1; each X is any halogen; $n$ is 0, 1, 2 or 3; each R is chosen from the group consisting of any monovalent hydrocarbon radical and hydrogen; and $y$ is a number from 1 to 4;

(2) 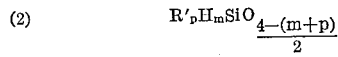

wherein each R′ is chosen from the group consisting of hydrocarbon radicals, alkoxy radicals, aryloxy radicals and halogens; $p$ is 0, 1, 2 or 3; each H is a hydride radical; $m$ is 1, 2, 3 or 4; Si is silicon; and O is oxygen.

2. The process of claim 1 wherein the substance conforming to the formula

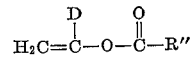

is vinyl acetate.

3. The process of claim 1 wherein the substance conforming to the formula

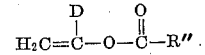

is vinyl chloroacetate.

4. The process of claim 1 wherein the substance conforming to the formula

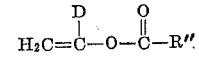

is vinyl benzoate.

5. The process of claim 1 wherein said organometallic compound is an aluminum alkyl.

6. The process of claim 1 wherein said organometallic compound is a silane.

7. The process of claim 1 wherein said organometallic compound is a dialkylsilane.

8. The process of claim 1 wherein in said formula $$TO_aX_b$$

each X is chlorine.

9. The process of claim 1 wherein in said formula $$TO_aX_b$$

$a$ is 0.

10. The process of claim 1 wherein in said formula $$TO_aX_b$$

$a$ is 0 and each X is chlorine.

11. The process of claim 1 wherein in said formula $$TO_aX_b$$

T is a member of Group IVa.

12. The process of claim 1 wherein in said formula $$TO_aX_b$$

T is zirconium.

13. The process of claim 1 wherein in said formula $$TO_aX_b$$

T is titanium.

14. The process of claim 1 wherein in said formula $$TO_aX_b$$

T is titanium, $a$ is 0 and each X is chlorine.

15. The process of claim 1 wherein in said formula $$TO_aX_b$$

T is a member of Group Va.

16. The process of claim 1 wherein in said formula $$TO_aX_b$$

T is vanadium.

17. The process of claim 1 wherein in said formula $$TO_aX_b$$

T is a member of Group VIa.

18. The process of claim 1 wherein in said formula

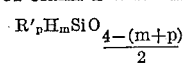

$p$ is 3 and $m$ is 1.

19. A process for homo-polymerizing vinyl esters and mixtures of vinyl esters, which comprises contacting at temperatures between about −80° C. and about 190° C., a substance conforming to the formula

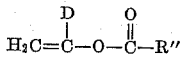

wherein D is chosen from the group consisting of hydrogen, any hydrocarbon group having 1 to 3 carbon atoms and any substituted hydrocarbon group having 1 to 3 carbon atoms; and R″ is any radical chosen from the group consisting of hydrocarbon radicals and halogen-substituted hydrocarbon radicals having 1–18 carbon atoms, with a catalyst comprising
(1) the product of the reaction, accomplished at temperatures between about 0° C. and about 300° C., for a minimum period ranging from about 10 hours to about 15 minutes, the higher the temperature used, the shorter being the minimum time required, of
  (a) a compound conforming to the formula:

where T is chosen from the group consisting of the metals of Groups IV$a$, V$a$, and VI$a$; O is oxygen; $a$ is 0 or 1; each X is any halogen; and $b$ is a number from 1 to 6; and
  (b) hydroxyl groups in the surface of a particulate finely divided inorganic solid having an average particle diameter of less than about 0.1 micron and carrying in chemical combination on the surface thereof at least about $1 \times 10^{-4}$ equivalents per gram of hydroxyl groups; and
(2) an organometallic compound chosen from the group consisting of compounds conforming to the empirical formulae

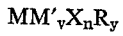

wherein M is chosen from the group consisting of the metals of Groups I, II and III; M′ is a metal of Group I; $v$ is 0 or 1; each X is any halogen; $n$ is 0, 1, 2 or 3; each R is chosen from the group consisting of any monovalent hydrocarbon and hydrogen; and $y$ is an integer from 1 to 4; and

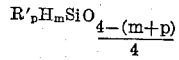

wherein R′ is chosen from the group consisting of hydrocarbon radicals, aryloxy radicals, alkoxy radicals and the halogens; $p$ in 0, 1, 2 or 3; each H is a hydride radical; $m$ is 1, 2, 3 or 4; Si is silicon; and O is oxygen.

20. The process of claim 19 wherein the reaction between the compound conforming to the formula

and hydroxyl groups in the surface of a particulate finely divided inorganic solid is accomplished at temperatures between about 25° C. and about 105° C.

References Cited by the Examiner
UNITED STATES PATENTS

| | | | |
|---|---|---|---|
| 3,166,541 | 1/1965 | Orzechowski | 260—93.7 |
| 3,166,542 | 1/1965 | Orzechowski | 260—93.7 |
| 3,166,543 | 1/1965 | Orzechowski | 260—93.7 |

FOREIGN PATENTS

| | | |
|---|---|---|
| 823,024 | 11/1959 | Great Britain. |
| 819,291 | 9/1959 | Great Britain. |
| 592,111 | 7/1959 | Italy. |

OTHER REFERENCES

Gaylord et al., Linear and Steroregular Addition Polymer, pp. 487 and 500, Interscience, New York (1959).

JOSEPH L. SCHOFER, *Primary Examiner.*

J. F. McNALLY, FRED L. DENSON,
*Assistant Examiners.*